(12) United States Patent
Tosa et al.

(10) Patent No.: US 9,400,885 B2
(45) Date of Patent: Jul. 26, 2016

(54) COMPUTER SECURITY SYSTEMS AND METHODS USING VIRTUALIZATION EXCEPTIONS

(71) Applicant: Bitdefender IPR Management Ltd., Nicosia (CY)

(72) Inventors: Raul V. Tosa, Cluj-Napoca (RO); Dan H. Lutas, Cluj-Napoca (RO); Daniel I. Ticle, Turda (RO); Sandor Lukacs, Floresti (RO)

(73) Assignee: Bitdefender IPR Management Ltd., Nicosia (CY)

( * ) Notice: Subject to any disclaimer, the term of this patent is extended or adjusted under 35 U.S.C. 154(b) by 0 days.

(21) Appl. No.: 14/533,670

(22) Filed: Nov. 5, 2014

(65) Prior Publication Data

US 2015/0199514 A1 Jul. 16, 2015

Related U.S. Application Data

(60) Provisional application No. 61/926,060, filed on Jan. 10, 2014.

(51) Int. Cl.
| | | |
|---|---|---|
| *G06F 21/55* | (2013.01) | |
| *G06F 21/57* | (2013.01) | |
| *G06F 9/455* | (2006.01) | |
| *G06F 21/53* | (2013.01) | |
| *G06F 21/74* | (2013.01) | |

(52) U.S. Cl.
CPC .......... *G06F 21/554* (2013.01); *G06F 9/45558* (2013.01); *G06F 21/53* (2013.01); *G06F 21/57* (2013.01); *G06F 21/74* (2013.01); *G06F 2009/45587* (2013.01); *G06F 2221/033* (2013.01)

(58) Field of Classification Search
None
See application file for complete search history.

(56) References Cited

U.S. PATENT DOCUMENTS

| | | | |
|---|---|---|---|
| 8,341,627 | B2 | 12/2012 | Mohinder |
| 8,397,242 | B1 | 3/2013 | Conover |
| 8,515,075 | B1 | 8/2013 | Saraf et al. |
| 8,621,620 | B2 | 12/2013 | Sallam |

(Continued)

OTHER PUBLICATIONS

European Patent Office, International Search Report and Written Opinion Mailed Oct. 22, 2015 for PCT International Application No. PCT/RO2015/050001, international filed Jan. 7, 2015, priority date Jan. 10, 2014.

(Continued)

*Primary Examiner* — Minh Dinh
(74) *Attorney, Agent, or Firm* — Law Office of Andrei D Popovici, PC

(57) ABSTRACT

Described systems and methods enable a host system to efficiently perform computer security activities, when operating in a hardware virtualization configuration. A hypervisor exposes a virtual machine on the host system. In some embodiments, the hypervisor further configures a processor of the host system to generate a virtualization exception in response to detecting a memory access violation, and to deliver such exceptions to a computer security program operating within the virtual machine. The hypervisor may further set access permissions to a section of memory containing a part of a function targeted for hooking, so that an attempt to execute the respective target function triggers a virtualization exception. Some embodiments thus achieve hooking of the target function without resorting to conventional methods, such as patching, inline hooking, and MSR hooking.

19 Claims, 9 Drawing Sheets

(56) References Cited

U.S. PATENT DOCUMENTS

| | | |
|---|---|---|
| 2002/0099874 A1 | 7/2002 | Bonola |
| 2005/0251864 A1 | 11/2005 | Kelley et al. |
| 2008/0235757 A1 | 9/2008 | Li |
| 2008/0288940 A1 | 11/2008 | Adams et al. |
| 2009/0089622 A1 | 4/2009 | Qi et al. |
| 2012/0254993 A1 | 10/2012 | Sallam |
| 2012/0254995 A1 | 10/2012 | Sallam |
| 2012/0255002 A1 | 10/2012 | Sallam |
| 2012/0255003 A1 | 10/2012 | Sallam |
| 2012/0255004 A1 | 10/2012 | Sallam |
| 2013/0086299 A1 | 4/2013 | Epstein |
| 2013/0086550 A1 | 4/2013 | Epstein |
| 2013/0125119 A1 | 5/2013 | Vipat et al. |
| 2013/0132690 A1 | 5/2013 | Epstein |
| 2013/0227680 A1 | 8/2013 | Pavlyushchik |
| 2013/0312099 A1 | 11/2013 | Edwards et al. |
| 2013/0347131 A1 | 12/2013 | Mooring et al. |
| 2014/0006877 A1 | 1/2014 | Zhu et al. |
| 2015/0121135 A1* | 4/2015 | Pape ............... G06F 11/1484 714/15 |
| 2015/0178497 A1* | 6/2015 | Lukacs ............... G06F 9/461 726/23 |

OTHER PUBLICATIONS

Sharif et al., "Secure in-VM monitoring using hardware virtualization," CCS '09 Proceedings of the 16th ACM conference on Computer and communications security, pp. 477-487, ACM New York, NY, USA, Nov. 2009.

* cited by examiner

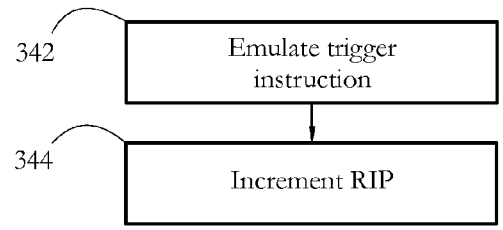
FIG. 9-A
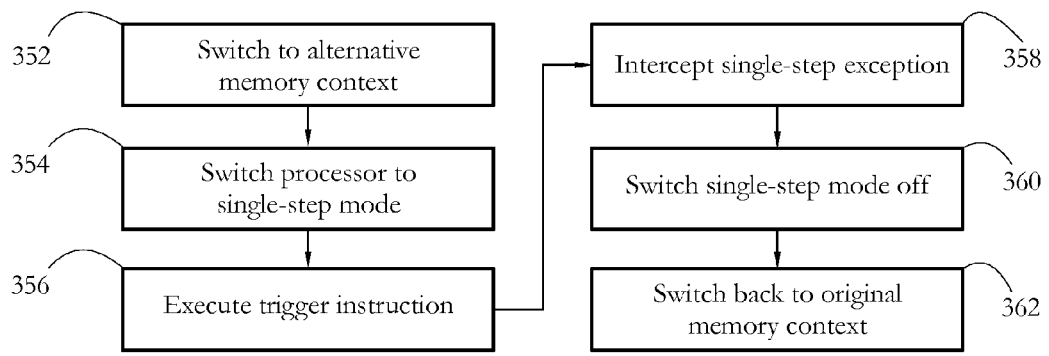
FIG. 9-B

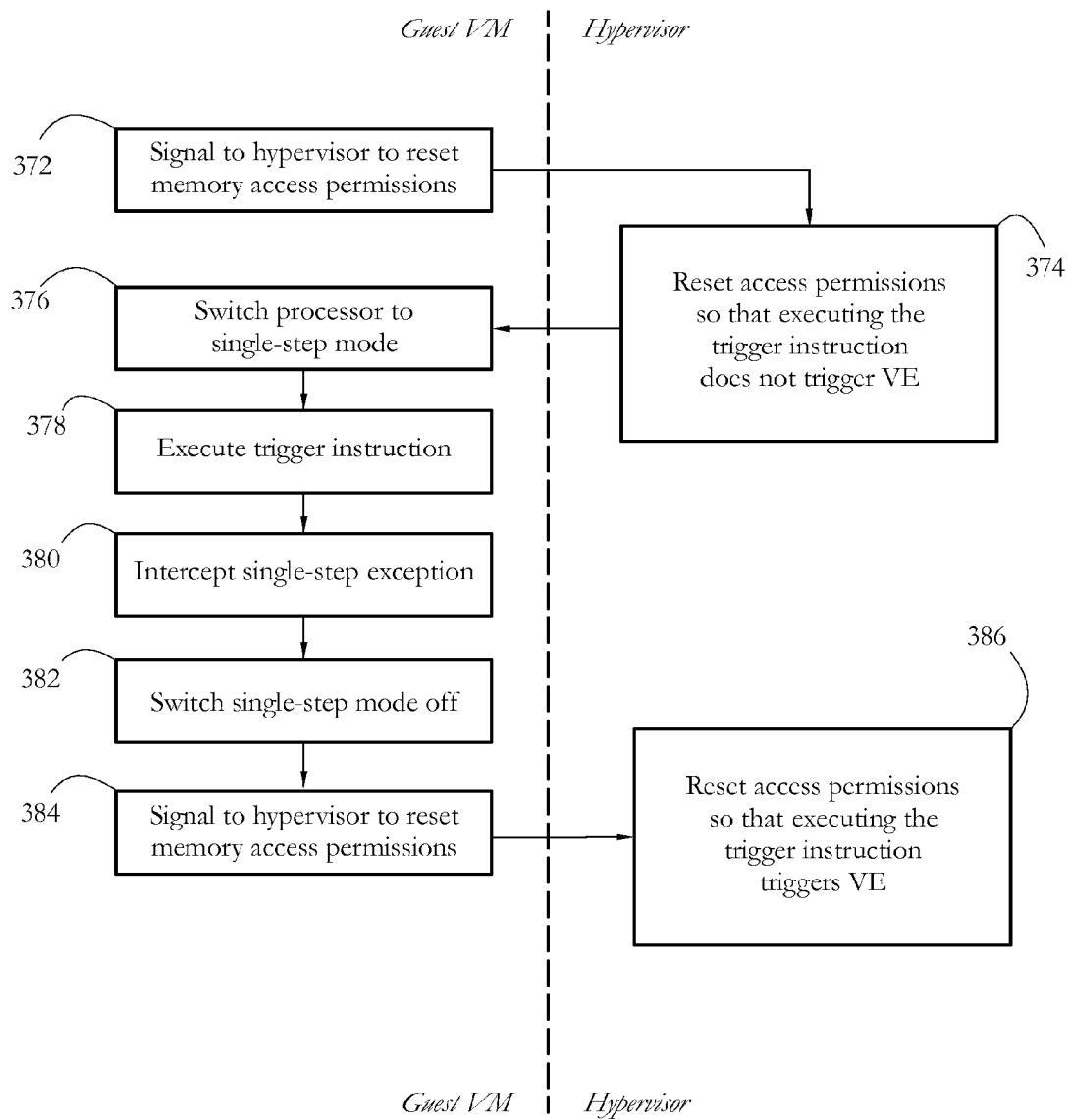
FIG. 9-C

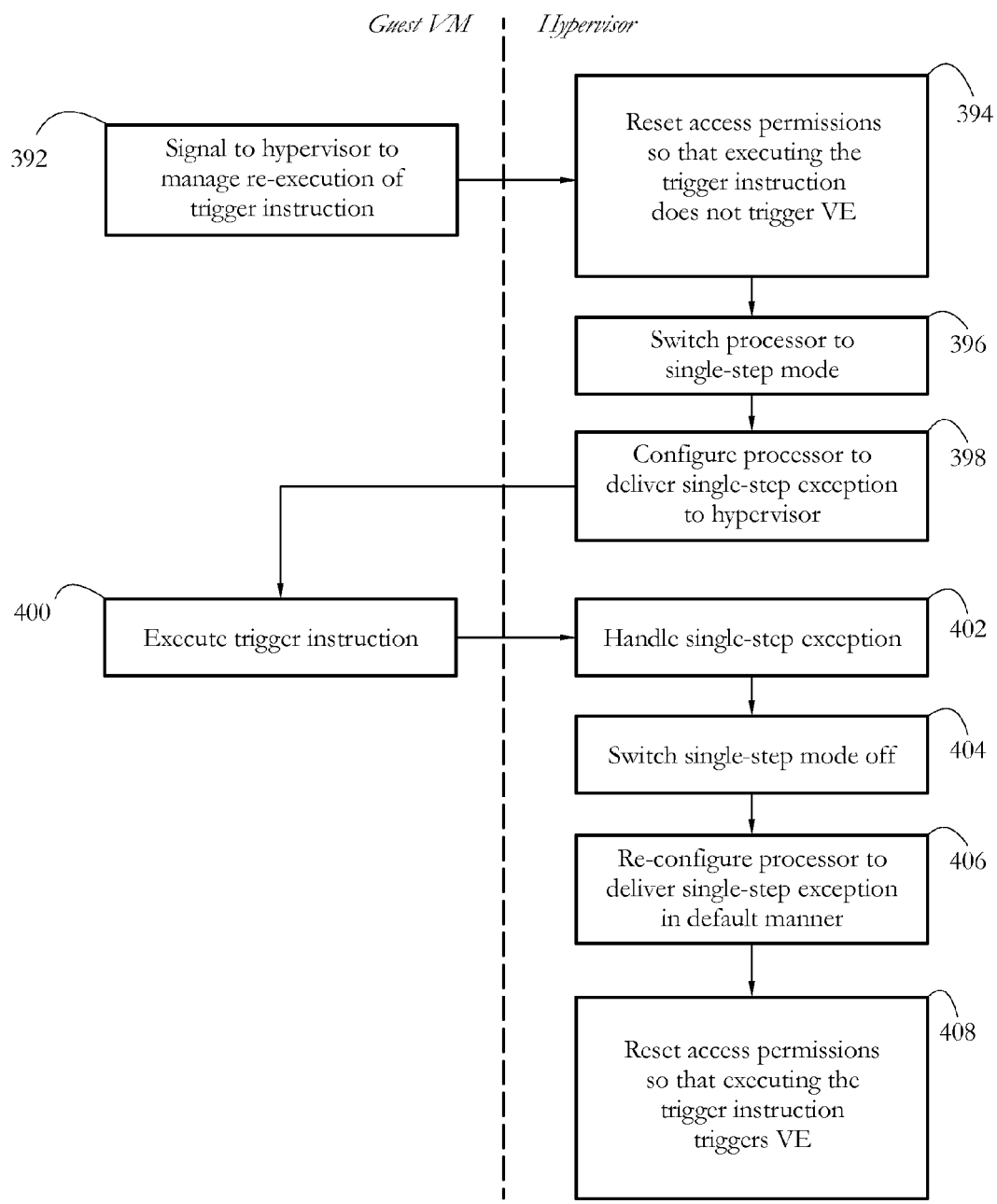
FIG. 9-D

COMPUTER SECURITY SYSTEMS AND METHODS USING VIRTUALIZATION EXCEPTIONS

RELATED APPLICATIONS

This application claims the benefit of the filing date of U.S. provisional patent application No. 61/926,060, filed on Jan. 10, 2014, entitled "Anti-Malware Systems And Methods Using Virtualization Exceptions", the entire contents of which are incorporated by reference herein.

BACKGROUND

The invention relates to computer security, and in particular to performing computer security operations in hardware virtualization configurations.

Malicious software, also known as malware, affects a great number of computer systems worldwide. In its many forms such as computer viruses, worms, and rootkits, malware presents a serious risk to millions of computer users, making them vulnerable to loss of data and sensitive information, identity theft, and loss of productivity, among others.

Modern computing applications often employ hardware virtualization technology to create simulated computer environments known as virtual machines (VM), which behave in many ways as physical computer systems. In applications such as server consolidation and infrastructure-as-a-service, several virtual machines may run simultaneously on the same computer system, sharing the hardware resources among them, thus reducing investment and operating costs. Each virtual machine may run its own operating system and/or software, separately from other virtual machines. Due to the steady proliferation of computer security threats such as malware and spyware, each such virtual machine potentially requires protection.

Some security solutions protect a host system by intercepting a call to a specific function, using any of a multitude of techniques generically known in the art as hooking Exemplary hooking methods include, among others, inline hooking, patching a system service descriptor table (SSDT) of the host system, and configuring specific software components executing on the host system to be notified about certain events via minifilter notifications (a feature offered by some operating systems, such as Windows®). Hooking a function typically results in redirecting a call to the respective function to another entity, such as a security application. The security application may thus detect an attempt by a software entity to perform a certain action, such as writing to a disk file, or accessing a memory space used by another entity. The security application may then analyze the attempt to determine, for instance, if it is indicative of a security threat.

Conventional hooking methods often place a substantial computational burden on the host system, degrading user experience and productivity. Moreover, such conventional methods are sometimes vulnerable, i.e., may be incapacitated by a malicious entity executing on the host system. Therefore, there is considerable interest in developing alternative hooking methods, and in particular, hooking methods optimized for virtualization environments.

SUMMARY

According to one aspect, a host system comprises at least one hardware processor configured to execute a hypervisor. The hypervisor is further configured to configure the at least one hardware processor to generate an exception in response to detecting a violation of a memory access permission, wherein generating the exception causes the at least one hardware processor to switch from executing a target function to executing a computer security program, wherein both the target function and the computer security program execute within a virtual machine exposed by the hypervisor, and wherein the computer security program is configured to determine whether the violation is indicative of a computer security threat. The hypervisor is further configured to configure the memory access permission so that an attempt to execute the target function violates the memory access permission.

According to another aspect, a method of protecting a host system from computer security threats comprises employing at least one hardware processor of the host system to execute a hypervisor. Executing the hypervisor includes exposing a virtual machine on the host system, and configuring the at least one hardware processor to generate an exception in response to detecting a violation of a memory access permission, wherein generating the exception causes the at least one hardware processor to switch from executing a target function to executing a computer security program, wherein both the target function and the computer security program execute within the virtual machine, and wherein the computer security program is configured to determine whether the violation is indicative of a computer security threat. Executing the hypervisor further includes configuring the memory access permission so that an attempt to execute the target function violates the memory access permission.

According to another aspect, a non-transitory computer-readable medium stores instructions which, when executed by at least one hardware processor of a host system, cause the host system to form a hypervisor and a computer security program, the computer security program executing within a virtual machine exposed by the hypervisor. The hypervisor is configured to configure the at least one hardware processor to generate an exception in response to detecting a violation of a memory access permission, wherein generating the exception causes the at least one hardware processor to switch from executing a target function to executing the computer security program, wherein the target function executes within the virtual machine, and wherein the computer security program is configured to determine whether the violation is indicative of a computer security threat. The hypervisor is further configured to configure the memory access permission so that an attempt to execute the target function violates the memory access permission.

According to another aspect, a method of protecting a host system from computer security threats comprises employing at least one hardware processor of the host system to determine whether executing a target function within a virtual machine exposed on the host system causes a violation of a memory access permission. The method further comprises, in response, when executing the target function causes the violation, employing the at least one hardware processor to generate an exception, the exception causing the at least one hardware processor to switch from executing the target function to executing a computer security program within the virtual machine, the computer security program configured to determine whether the violation is indicative of a computer security threat.

BRIEF DESCRIPTION OF THE DRAWINGS

The foregoing aspects and advantages of the present invention will become better understood upon reading the following detailed description and upon reference to the drawings where:

FIG. 9-A illustrates an exemplary sequence of steps performed by the security application according to some embodiments of the present invention. The illustrated steps handle the execution of an instruction, when the respective instruction has triggered a virtualization exception.

FIG. 9-B illustrates an alternative sequence of steps performed by the security application to handle the execution of the instruction which triggered a virtualization exception.

FIG. 9-C illustrates another exemplary sequence of steps performed by the security application in collaboration with the hypervisor, to handle the execution of the instruction which triggered the virtualization exception.

FIG. 9-D illustrates yet another exemplary sequence of steps performed by the security application in collaboration with the hypervisor, to handle the execution of the instruction which triggered the virtualization exception.

DETAILED DESCRIPTION OF PREFERRED EMBODIMENTS

In the following description, it is understood that all recited connections between structures can be direct operative connections or indirect operative connections through intermediary structures. A set of elements includes one or more elements. Any recitation of an element is understood to refer to at least one element. A plurality of elements includes at least two elements. Unless otherwise required, any described method steps need not be necessarily performed in a particular illustrated order. A first element (e.g. data) derived from a second element encompasses a first element equal to the second element, as well as a first element generated by processing the second element and optionally other data. Making a determination or decision according to a parameter encompasses making the determination or decision according to the parameter and optionally according to other data. Unless otherwise specified, an indicator of some quantity/data may be the quantity/data itself, or an indicator different from the quantity/data itself. A computer program is a sequence of processor instructions carrying out a task. Computer programs described in some embodiments of the present invention may be stand-alone software entities or sub-entities (e.g., subroutines, libraries) of other computer programs. Unless otherwise specified, a computer security program is a computer program that protects equipment and data against unintended or unauthorized access, modification or destruction. Unless otherwise specified, a process is an instance of a computer program, such as an application or a part of an operating system, and is characterized by having at least an execution thread and a virtual memory space assigned to it, wherein a content of the respective virtual memory space includes executable code. Unless otherwise specified, a page represents the smallest unit of virtual memory that can be individually mapped to a physical memory of a host system. Computer readable media encompass non-transitory media such as magnetic, optic, and semiconductor storage media (e.g. hard drives, optical disks, flash memory, DRAM), as well as communication links such as conductive cables and fiber optic links According to some embodiments, the present invention provides, inter alia, computer systems comprising hardware (e.g. one or more processors) programmed to perform the methods described herein, as well as computer-readable media encoding instructions to perform the methods described herein.

The following description illustrates embodiments of the invention by way of example and not necessarily by way of limitation.

Figure 1:
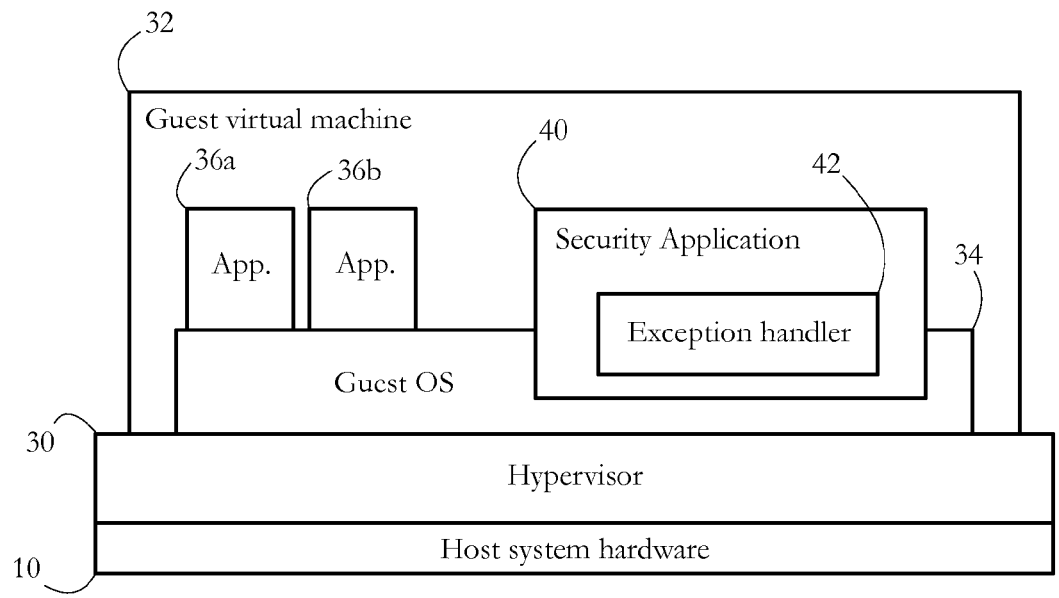
FIG. 1 shows exemplary software objects executing on a host system, including a security application protecting the host system from computer security threats according to some embodiments of the present invention.

FIG. 1 illustrates an exemplary set of software objects executing on a host system 10 in a hardware virtualization configuration according to some embodiments of the present invention. Host system 10 may represent a corporate computing device such as an enterprise server, or an end-user device such as a personal computer, tablet computer, or smartphone. Other exemplary host systems include TVs, game consoles, wearable computing devices, or any other electronic device having a memory and a processor.

Figure 2:
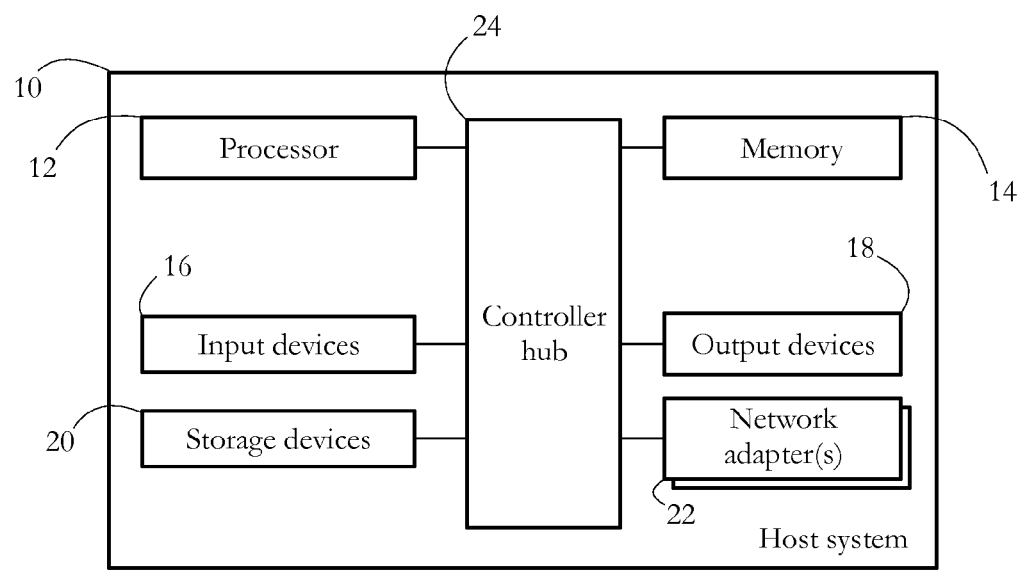
FIG. 2 shows an exemplary hardware configuration of a host computer system according to some embodiments of the present invention.

FIG. 2 shows exemplary hardware components of host system 10. The illustrated host system is a computer system; the hardware configuration of other systems, such as smartphones and tablet computers, may differ. System 10 comprises a set of physical devices, including a processor 12, a memory unit 14, a set of input devices 16, a set of output devices 18, a set of storage devices 20, and a set of network adapters 22, all connected by a controller hub 24. In some embodiments, processor 12 comprises a physical device (e.g. multi-core integrated circuit formed on a semiconductor substrate) configured to execute computational and/or logical operations with a set of signals and/or data. In some embodiments, such logical operations are delivered to processor 12 in the form of a sequence of processor instructions (e.g. machine code or other type of software).

Memory unit 14 may comprise volatile computer-readable media (e.g. RAM) storing data/signals accessed or generated by processor 12 in the course of carrying out instructions. Input devices 16 may include computer keyboards, mice, and microphones, among others, including the respective hardware interfaces and/or adapters allowing a user to introduce data and/or instructions into host system 10. Output devices 18 may include display devices such as monitors and speakers, among others, as well as hardware interfaces/adapters such as graphic cards, allowing host system 10 to communicate data to a user. In some embodiments, input devices 16 and output devices 18 may share a common piece of hardware, as in the case of touch-screen devices. Storage devices 20 include computer-readable media enabling the non-volatile storage, reading, and writing of processor instructions and/or data. Exemplary storage devices 20 include magnetic and optical disks and flash memory devices, as well as removable media such as CD and/or DVD disks and drives. The set of network adapters 22 enables host system 10 to connect to a computer network and/or to other devices/computer systems.

Controller hub 24 generically represents the plurality of system, peripheral, and/or chipset buses, and/or all other circuitry enabling the communication between processor 12 and devices 14, 16, 18, 20 and 22. For instance, controller hub 24 may include a memory management unit (MMU), an input/output (I/O) controller, and an interrupt controller, among others. In another example, controller hub 24 may comprise a northbridge connecting processor 12 to memory 14 and/or a southbridge connecting processor 12 to devices 16, 18, 20, and 22. In some embodiments, parts of controller hub (such as the MMU) may be integrated with processor 12, i.e., may share a common substrate with processor 12.

In the exemplary configuration of FIG. 1, host system 10 used hardware virtualization technology to operate a virtual machine (VM) 32 exposed by a hypervisor 30. Alternatively, host system 10 may operate multiple virtual machines concurrently, wherein each VM may be protected as shown. The term "virtual machine" is commonly used in the art to denote an abstraction, e.g., a software emulation, of an actual physical machine/computer system, the VM capable of running an operating system and other software. In some embodiments, hypervisor 30 includes software configured to create or enable a plurality of virtualized devices, such as a virtual processor and a virtual controller, and to present such virtualized devices to software in place of the real, physical devices of host system 10. Such operations of hypervisor 30 are commonly known in the art as exposing a virtual machine. In some embodiments, hypervisor 30 allows a multiplexing (sharing) by multiple virtual machines of hardware resources of host system 10. Hypervisor 30 may further manage such multiplexing so that each guest VM operates independently and is unaware of other VMs executing concurrently executing on host system 10. Examples of popular hypervisors include the VMware vSphere™ from VMware Inc. and the open-source Xen hypervisor, among others.

VM 32 executes a guest operating system (OS) 34 and a set of exemplary applications 36a-d, which generically represent any software application, such as word processing, image processing, media player, database, calendar, personal contact management, browser, gaming, voice communication, data communication, and anti-malware applications, among others. OS 34 may comprise any widely available operating system such as Microsoft Windows®, MacOS®, Linux®, iOS®, or Android™, among others, providing an interface between applications executing within VM 32 and the virtualized hardware devices of VM 32. In the following description, software executing on a virtual processor of a virtual machine is said to execute within the respective virtual machine. In the example of FIG. 1, applications 36a-b are said to execute within guest VM 32. In contrast, hypervisor 30 is said to execute outside, or below, guest VM 32.

Figure 3:
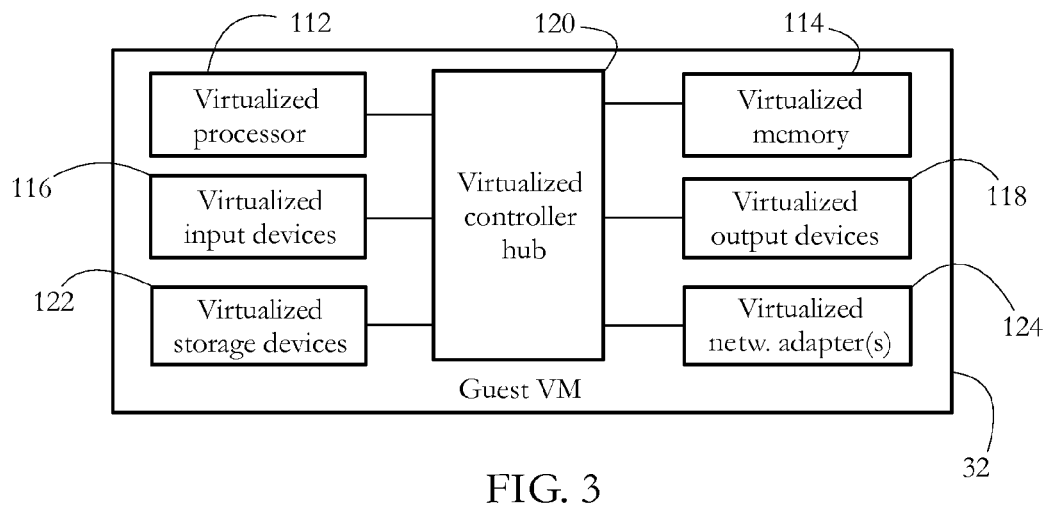
FIG. 3 shows exemplary virtualized hardware components of a guest virtual machine executing on the host system according to some embodiments of the present invention.

FIG. 3 shows an exemplary configuration of VM 32, as exposed by hypervisor 30. VM 32 includes a virtualized processor 112, a virtualized memory unit 114, virtualized input devices 116, virtualized output devices 118, virtualized storage 120, virtualized network adapters 122, and a virtualized controller hub 124. Virtualized processor 112 comprises an emulation of at least some of the functionality of processor 12, and is configured to receive for execution processor instructions forming part of software such as operating system 34 and applications 36a-b. Software using processor 112 for execution is deemed to execute within virtual machine 32. In some embodiments, virtualized memory unit 114 comprises addressable spaces for storing and retrieving data used by virtualized processor 112. Other virtualized devices (e.g., virtualized input, output, storage, etc.) emulate at least some of the functionality of the respective physical devices of host system 10. Virtualized processor 112 may be configured to interact with such virtualized devices as it would with the corresponding physical devices. For instance, software executing within VM 52 may send and/or receive network traffic via virtualized network adapter(s) 122. In some embodiments, hypervisor 30 may expose only a subset of virtualized devices to VM 32 (for instance, only virtualized processor 112, virtualized memory 114, and parts of hub 124). Hypervisor 30 may give exclusive use of some hardware devices of host system 10 (e.g., input devices 16 and/or output devices 18) to a selected VM, and exclusive use of other devices (e.g., network adapters 22) to another VM. Such configurations may be implemented, for instance, using VT-d® technology from Intel®.

In some embodiments, a security application 40 is executing within guest VM 32, application 40 configured to protect guest VM 32 from computer security threats such as malware and spyware. Application 40 may be configured, for instance, to detect malicious software and/or to preventing the execution of such software. In some embodiments, security application 40 comprises an exception handler 42 configured to handle virtualization exceptions as shown in more detail below.

Modern processors implement a hierarchy of processor privilege levels, also known in the art as protection rings. Each such ring or level is characterized by a set of actions and/or processor instructions that software executing within the respective ring is allowed to carry out. Exemplary privilege levels/rings include user mode (ring 3) and kernel mode (ring 0). Some host systems configured to support hardware virtualization may include an additional ring with the highest processor privileges (e.g., ring-1, root mode, or VMXroot on Intel® platforms). In some embodiments, hypervisor 30 takes control of processor 12 at the most privileged level (ring-1) to create and manage the hardware virtualization platform exposed as VM 32 to other software executing on host system 10. Operating system 34 may execute with lesser processor privilege than hypervisor 30 (e.g., ring 0 on Intel platforms, or kernel mode). Applications 36a-b may execute with lesser processor privilege than OS 34 (e.g., ring 3, or user mode). In some embodiments, parts of security application 40, such as exception handler 42, may execute at kernel privilege level.

Figure 4:
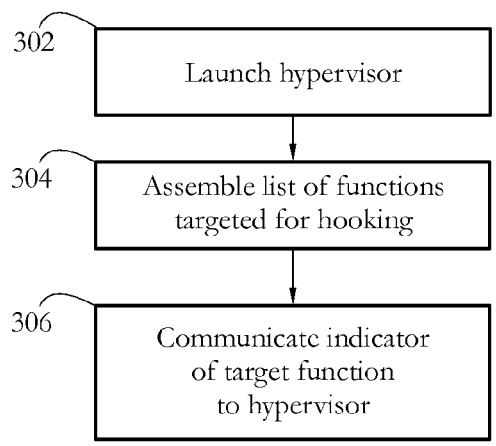
FIG. 4 shows an exemplary sequence of steps performed by the security application in FIG. 1 to set up protection according to some embodiments of the present invention.

FIG. 4 shows an exemplary sequence of steps performed by security application 40 to set up protection of host system 10 according to some embodiments of the present invention. Steps 302-306 may be executed, for instance, as part of an installation of application 40 on host system 10. In another example, application 40 is already installed on the host system, and step 302 is executed when a user launches application 40 on demand. In some embodiments, step 302 results in the initialization of hypervisor 30 (more details are given below).

In a step 304, application 40 may assemble a list of functions targeted for hooking Such functions will hereby be termed target functions. Target functions may include, among others, functions of guest OS 34 performing operations such as memory allocation, data reading and/or writing, and registry editing. Some target functions may be part of a code module (e.g., of a dynamic-linked library—DLL), or part of a kernel-mode driver, or part of the kernel of OS 34 (e.g. ntoskrnl.exe in Windows®). Some exemplary target functions of the Windows® OS include selected functions of the NTDLL.DLL and KERNEL32.DLL libraries. In a Linux® OS, target functions may include selected functions of LIBC.SO.

In a step 306, security application 40 communicates an indicator of each function to hypervisor 30. Such indicators of a target function may include, among others, a virtual or physical address (e.g., a pointer) of a section of memory containing code of the respective target function. Some embodiments may determine a pointer to a target function by parsing a data structure used by guest OS 34 to manage currently executing processes and/or threads, or by parsing a data structure specific to an executable file or a module of the currently executing process. Such data structures of a Windows® environment include, among others, a function export table. Steps 304-306 may be performed dynamically, for instance each time an application or a code module (e.g., DLL) containing the function targeted for hooking is loaded into memory and prepared for execution.

To communicate data from within guest VM 32 to hypervisor 30 (e.g. as part of carrying out step 306), some embodiments may use an inter-process communication method known in the art of virtualization. In one example, security application 40 may write the respective data to a pre-determined section of memory, and issue a particular function call (e.g., VMCALL on Intel® platforms) which triggers a processor event (e.g., VMExit on Intel® platforms) configured to suspend execution of guest VM 32 and transfer control of processor 12 to hypervisor 30. Hypervisor 30 may include a handler routine configured to intercept the processor event, thus receiving notification from security application 40 that data is being transmitted from within guest VM 32. In response, hypervisor 30 may read the respective data from the pre-determined memory section shared with application 40, and return execution to guest VM 32.

Figure 5:
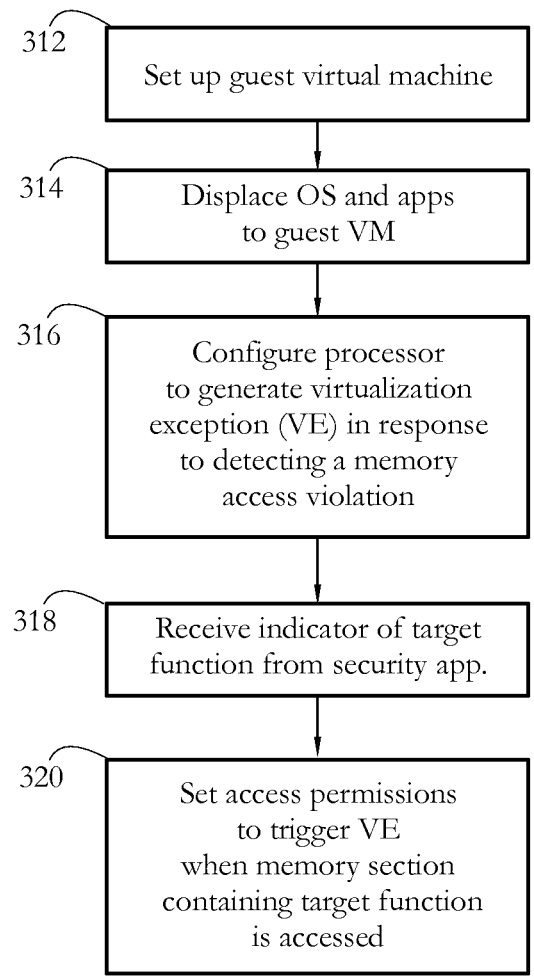
FIG. 5 shows an exemplary sequence of steps executed by the hypervisor to set up protection according to some embodiments of the present invention.

FIG. 5 shows an exemplary sequence of steps performed by hypervisor 30 to set up protection of host system 10 according to some embodiments of the present invention. In response to initializing application 40 (step 302 in FIG. 4), in a sequence of steps 312-314 hypervisor 30 may set up guest virtual machine 32 and may expose VM 32 to OS 34 and applications such as applications 36a-b and 40 in FIG. 1. Steps 312-314 can be performed either before loading OS 34, or alternatively, after OS 34 is loaded. In one such example, commonly known as late-loading or late-launching the hypervisor, guest OS 34 executes directly on bare-metal, non-virtualized hardware. Launching hypervisor 30 then results in hypervisor 30 taking over control of hardware from OS 34 and displacing OS 34 to guest VM 32. Subsequent execution of OS 34 therefore proceeds on virtualized hardware.

In some embodiments, setting up guest VM 32 comprises configuring a data structure used by hypervisor 30 to manage operation of guest VM 32. Such a structure will be herein termed virtual machine state object (VMSO). Exemplary VMSOs include the virtual machine control structure (VMCS) on Intel® platforms, and the virtual machine control block (VMCB) on AMD® platforms. In some embodiments, processor 12 associates a region in memory with each VMSO, so that software may reference a specific VMSO using a memory address or pointer (e.g., a VMCS pointer on Intel® platforms).

Each VMSO may comprise data representing a current state of a respective virtualized processor exposed on host system 10. In multithreading configurations, hardware processor 12 may operate a plurality of cores, each core further comprising multiple logical processors, wherein each logical processor may process an execution thread independently of, and concurrently with, other logical processors. Multiple logical processors may share some hardware resources, for instance, a common MMU. In a multithreaded embodiment, a distinct VMSO may be set up for each distinct logical processor. The respective VMSO may comprise a guest state area and a host state area, the guest state area holding the CPU state of the respective guest VM, and the host state area storing the current state of hypervisor 30. In some embodiments, the guest-state area of the VMSO includes contents of the control registers (e.g., CR0, CR3, etc.), instruction pointer (e.g., RIP), general-purpose registers (e.g., EAX, ECX, etc.), and status registers (e.g., EFLAGS) of the virtual processor of the respective guest VM, among others. The host state area of the VMSO may include a pointer (e.g., an EPT pointer on Intel® platforms) to a page table configured for address translations for guest VM 32.

In some embodiments, processor 12 may store a part of a VMSO within dedicated internal registers/caches, while other parts of the respective VMSO may reside in memory. At any given time, at most one VMSO (herein termed the current VMSO) may be loaded onto the processor, identifying the virtual machine currently having control of processor 12. When processor 12 switches from executing the respective VM to executing hypervisor 50 (e.g., in response to a VMexit event), processor 12 may save the state of the respective VM to the guest state area of the current VMSO.

In a step 316, hypervisor 30 may configure processor 12 to generate a processor event, herein termed virtualization exception, in response to detecting an attempt by software executing within guest VM 32 to violate a memory access permission. In some embodiments, virtualization exceptions comprise a particular class of processor exceptions, occurring during execution of software within a VM. Processor exceptions are anomalous or exceptional events changing the normal flow of program execution and requiring special processing. Exemplary exceptions include, among others, a division by zero and an out of memory condition. In general, an exception is handled by halting execution of the instruction triggering the exception, saving the current processor state to a predefined location and switching execution to a specific subroutine known as an exception handler. In some embodiments, virtualization exceptions suspend the execution of the current instruction (the instruction executing within guest VM 32), and switch processor 12 to executing an exception handler routine, also within guest VM 32.

In some embodiments, configuring processor 12 to generate virtualization exceptions comprises writing a specific value to a dedicated control field of the VMSO of guest VM 32. For instance, on Intel® platforms, a field controlling virtualization exception behavior is the "EPT violation #VE" control bit of the VM execution control of the VMCS of guest VM 32. Some embodiments of the present invention further configure processor 12 to use exception handler 42 as the appropriate routine for handling virtualization exceptions.

In a step 318, hypervisor 30 receives from security application 40 an indicator (e.g., a pointer) of a function targeted for hooking. In response, in a step 320, hypervisor 30 may identify according to the respective indicator a section of memory containing a part of the respective target function. The respective section of memory may store, for instance, an entry point of the target function. In some embodiments, step 320 comprises performing a set of memory address translations to identify the respective memory section. Hypervisor 30 may further set memory access permissions for the respective section of memory so that an attempt by software executing within guest VM 32 to access the respective section of memory is interpreted as a memory access violation. Following the setting of such permissions, an attempt to execute the target function will trigger a virtualization exception. When limitations of the hardware platform do not allow setting execute rights to a section of memory, some embodiments of hypervisor 30 may mark the respective memory section as non-readable (read-protection). In such embodiments, a virtualization exception may be triggered by an attempt to fetch an executable instruction from a read-protected section of memory.

To be able to protect a guest VM in a configuration as illustrated in FIG. 1 (i.e., from outside the respective VM), some embodiments employ address translation data structures and/or address translation mechanisms of processor 12. Virtual machines typically operate with a virtualized physical memory (see, e.g., memory 114 in FIG. 3), also known in the art as guest-physical memory. Physical memory 14 typically comprises a contiguous space of addresses, known in the art as host-physical addresses (HPA). Virtualized physical memory comprises an abstract representation of the actual physical memory 14, for instance as a contiguous space of addresses, commonly termed guest-physical addresses (GPA). Each such address space is uniquely attached to a guest VM, with parts of said address space mapped to sections of physical memory 14 and/or physical storage devices 20. In systems configured to support virtualization, such mapping is typically achieved using hardware-accelerated, dedicated data structures and mechanisms controlled by processor 12, known as second level address translation (SLAT). Popular SLAT implementations include extended page tables (EPT) on Intel® platforms, and rapid virtualization indexing (RVI)/nested page tables (NPT) on AMDC® platforms. In such systems, virtualized physical memory may be partitioned in units known in the art as pages, a page representing the smallest unit of virtualized physical memory individually mapped to physical memory via mechanisms such as EPT/NPT, i.e., mapping between physical and virtualized physical memory is performed with page granularity. All pages typically have a predetermined size, e.g., 4 kilobytes, 2 megabytes, etc. The partitioning of virtualized physical memory into pages is usually configured by hypervisor 30. In some embodiments, hypervisor 30 also configures the SLAT structures, and therefore configures address translation between physical memory and virtualized physical memory. Such address translations are known in the art as guest-physical to host-physical (GPA-to-HPA) translations.

In some embodiments, the operating system executing within a VM sets up a virtual memory space for each process executing within the respective VM, said virtual memory space representing an abstraction of physical memory. Process virtual memory typically comprises a contiguous space of addresses, commonly known in the art as guest-virtual addresses (GVA) or guest-linear addresses (GLA). In some embodiments, process virtual memory spaces are also partitioned into pages, such pages representing the smallest unit of virtual memory individually mapped by the OS to the virtualized physical memory of the respective VM, i.e., virtual to virtualized-physical memory mapping is performed with page granularity. The OS may configure a dedicated data structure, such as a page table, used by the virtualized processor of the respective VM to perform guest virtual to guest physical, or GVA-to-GPA address translations.

Figure 6:
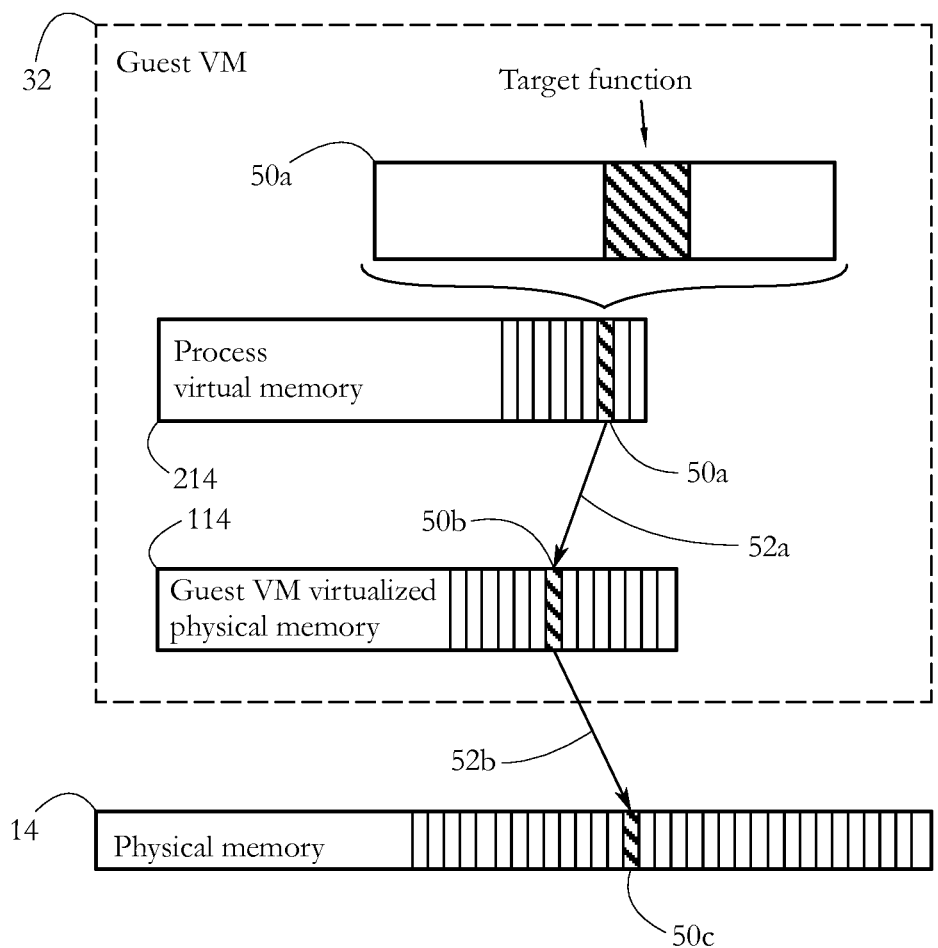
FIG. 6 shows an exemplary virtual memory page storing a function targeted for hooking, and an exemplary address translation mechanism according to some embodiments of the present invention.

FIG. 6 illustrates an exemplary memory address translation in the embodiment of FIG. 1. Following exposure by hypervisor 30, guest VM 32 sees virtualized physical memory space 114 as its own physical memory space. A process executing within guest VM 32 is assigned a virtual memory space 214 by guest OS 34. When the process attempts to access a content of a page 50*a*, a GVA of page 50*a* is translated by the MMU of guest VM 32 into a guest-physical address of a page 50*b* within virtualized physical memory space 114. The respective GVA-to-GPA translation 52*a* may proceed, for instance, according to page tables configured and controlled by guest OS 34. Page 50*b* is further mapped by processor 12 to a page 50*c* within physical memory 14 of host system 10. The respective GPA-to-HPA translation 52*b* may proceed, for instance, according to SLAT structures configured by hypervisor 30.

Some hardware configurations allow hypervisor 30 to selectively control access to data stored in memory, for instance, by setting read, write, and/or execute access rights to a section of memory. Hypervisor 30 may thus select which software object may access data stored within the respective memory section, and/or may indicate which operations are allowed with the respective data, e.g., read, write, execute. An attempt by a software object executing within guest VM 32 to perform an illegal operation such as writing data to a section marked as non-writable, or executing code from a section marked as non-executable, may be interpreted as a memory access violation, and may trigger a virtualization exception. In some embodiments, hypervisor 30 can set access permissions with page granularity, i.e., all addresses located within a memory page have identical access permissions. In one such example, permissions for each physical memory page (e.g., page 50*c* in FIG. 6) may be specified by setting specific fields within a SLAT entry corresponding to the respective page. Some host systems may allow setting access permissions with sub-page granularity. In such cases, some embodiments may set access permissions to ranges of memory spanning less than a page, for instance marking a range of 256 bytes out of a full 4 KB memory page as non-readable.

In the example of FIG. 6, a target function occupies a part of virtual memory page 50*a*. In such a case, some embodiments may mark physical memory page 50*c* corresponding to page 50*a* as non-executable, to trigger a virtualization exception in response to an attempt to fetch and/or execute the target function. When the target function spans multiple virtual memory pages, each page spanned by the target function may be marked as non-readable and/or non-executable. In an alternative embodiment, only a single page spanned by the target function (for instance, the page storing the entry point of the target function) is marked as non-readable and/or non-executable.

Figure 7:
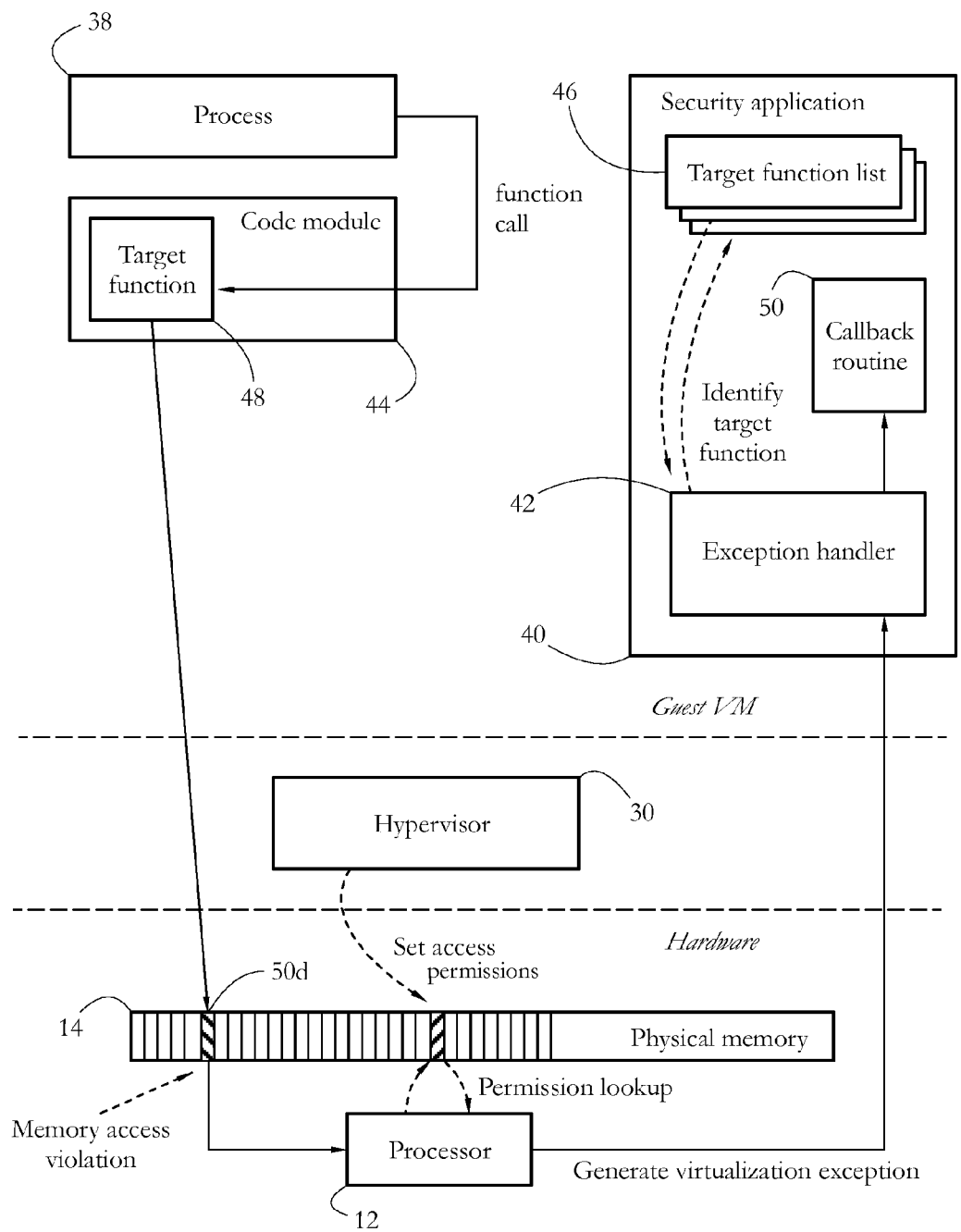
FIG. 7 illustrates a triggering of a virtualization exception by a process calling a hooked function, and an exemplary handling of the exception according to some embodiments of the present invention.

FIG. 7 illustrates the triggering of a virtualization exception by a process calling a function selected for hooking, and an exemplary handling of the exception by exception handler 42 according to some embodiments of the present invention. In some embodiments, security application 40 manages a target function list 46 comprising functions selected for hooking. In the current example, one such target function 48 is part of a code module 44 (e.g., a DLL) loaded by a process 38. In some embodiments, security application 40 associates a callback routine to each target function on list 46. Each such function-specific callback may comprise a sequence of code performing certain operations designed to alter the functionality of the target function. In some embodiments, the callback routine will be executed instead (or before) executing its respective target function. One exemplary callback routine notifies security application 40 every time an attempt is made to execute the target function.

When target process 48 is on list 46, some embodiments mark a memory page 50*d* containing a part of target function 48 as non-readable or non-executable (see above, in relation to FIG. 5). When process 38 issues a call to target function 48, the call results in an attempt to execute code from page 50*d*. In response, processor 12 looks up the access permissions of page 50d and determines that the attempt violates such access permissions. In response to detecting the violation, processor 12 generates a virtualization exception, and may deliver the exception to handler 42. In some embodiments, handler 42 identifies the target function which triggered the exception according to details of the exception, and launches an appropriate callback routine 50.

Figure 8:
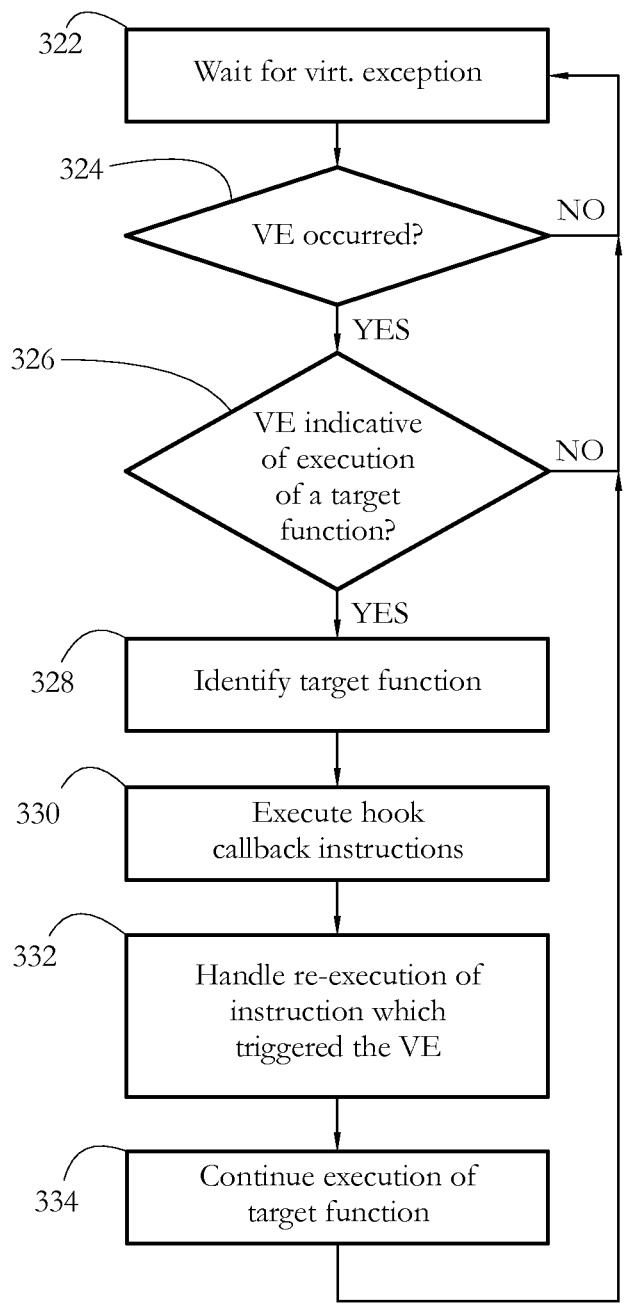
FIG. 8 shows an exemplary sequence of steps performed by the exception handler according to some embodiments of the present invention.

FIG. 8 shows an exemplary sequence of steps performed by exception handler 42 according to some embodiments of the present invention. A sequence of steps 322-324 waits for the occurrence of a virtualization exception. When such an exception is delivered to handler 42, a step 326 determines whether the respective exception is triggered by an actual attempt to execute the target function. In cases when code of the target function occupies only a fraction of the respective memory page, the virtualization exception may be triggered by an attempt to access an address, which is not within the section of code of the target function, but belongs instead to another software object. To verify whether the exception is indicative of an actual attempt to execute the target function, handler 42 and/or hypervisor 30 may determine which memory address triggered the exception, for instance according to parameters of the virtualization exception. In some embodiments, parameters of the exception specify the CPU state at the moment when the exception occurred, including values of the instruction pointer and CR3 register. Knowledge of such values may allow handler 42 to determine whether the instruction pointer indicates a memory section containing code of the target function. When the exception is indeed indicative of an attempt to execute the target function, in a step 328, handler 42 may identify the target function, and redirect execution to the appropriate callback (step 330).

A step 332 may then handle the execution of the instruction, which triggered the virtualization exception (herein deemed trigger instruction). In some embodiments, a virtualization exception occurring during execution of a processor instruction suspends the execution of the respective instruction, while execution is redirected to the exception handler. Therefore, in order to continue execution of the target function, the trigger instruction may need to be re-executed following the handling of the exception. A simple re-execution will typically re-trigger the virtualization exception, leading to an infinite loop. Therefore, such re-execution may require particular handling. FIGS. 9-A-D illustrate several alternative manners of handling the re-execution of the trigger instruction (step 332 in FIG. 8).

In one example, shown in FIG. 9-A, in a step 342, security application 40 and/or hypervisor 30 emulate the trigger instruction. Such emulation may include, for instance, performing all updates and/or changes to CPU registers and/or memory locations referenced by the trigger instruction according to the semantics of the trigger instruction. A step 344 then increments the instruction pointer register (RIP on x86 platforms) according to the trigger instruction, to indicate a state wherein the trigger instruction has finished executing.

In another example, illustrated in FIG. 9-B, to handle the re-execution of the trigger instruction, in a step 352, security application 40 may switch to an alternative memory context embodied by an alternative SLAT structure (e.g., EPT), wherein an attempt to execute the trigger instruction does not amount to a violation of access permissions. In some embodiments, such memory context switching is achieved via a dedicated processor instruction, such as VMFUNC on Intel® platforms. In preparation for performing the memory context switch, hypervisor 30 may configure the alternative EPT/NPT and the manner in which VMFUNC executes the switch. In a step 354, some embodiments may further switch processor 12 into single-step mode, wherein execution is suspended after each instruction, for instance by setting a value of a trap flag (TF) on Intel® platforms.

A step 356 may re-execute the trigger instruction within guest VM 32. Following execution of the trigger instruction, processor 12 may generate a single-step exception, as configured in step 354. A sequence of steps 358-360 may intercept the single step exception, and in response, switch the single-step mode off. A further step 362 may switch back to the original memory context (e.g., original EPT) configured, for instance, in step 320, i.e., to the memory context wherein executing the trigger instruction generates a virtualization exception. In some embodiments that employ single-stepping as described above, hypervisor 30 and/or security application 40 might temporarily intercept single step exceptions, such as debug exceptions (#DB) on Intel platforms, either by changing the corresponding interrupt descriptor table entry (e.g. to redirect single step exceptions to application 40), or by configuring VMSO-related exception bitmap entries to redirect single step exceptions to hypervisor 30.

In another example illustrated in FIG. 9-C, in a step 372, security application 40 may signal to hypervisor 30 to temporarily reset access permissions to the section of memory containing the trigger instruction, so that executing the trigger instruction no longer amount to a memory access violation. Step 372 may include application 40 forcing a VM exit (e.g., a VMExit event on Intel® platforms), to transfer control of processor 12 from guest VM 32 to hypervisor 30. In some embodiments, such a VM exit event may be triggered by a specific processor instruction, such as CPUID or VMCALL. In a step 376, some embodiments may further switch processor 12 into single-step mode, for instance by setting a value of a trap flag of the processor. A step 378 then executes the trigger instruction. A sequence of steps 380-382 intercepts the single-step exception generated by executing the trigger instruction, and switch single step mode off. Next, in a step 384, security application 40 may signal to hypervisor 30 to re-instate the original memory access permissions, which trigger a virtualization exception in response to a subsequent attempt to execute the trigger instruction. In some embodiments, step 384 include generation a VM exit event.

In yet another example, illustrated in FIG. 9-D, some of the steps executed within guest VM 32 in the example of FIG. 9-C are now executed by components of hypervisor 30. In a step 392, security application 40 signals to hypervisor 30 to manage the re-execution of the trigger instruction, for instance by triggering a VM exit event as shown above. In response, in a step 394, hypervisor 30 may temporarily re-configure access permissions so that executing the trigger instruction does not amount to a memory access violation, and therefore does not trigger a virtualization exception. A step 396 switches processor 12 to single-step mode. A step 398 modifies the manner in which processor 12 generates single-step exceptions, to deliver such exceptions to a component of hypervisor 30. For instance, step 398 may re-configure processor 12 to generate a VM exit event when a single-step exception occurs. Hypervisor 30 may then force execution of the trigger instruction by returning execution to guest VM 32 (e.g., via a VM entry event). In a step 400, the trigger instruction is executed within guest VM 32. The single-step exception thus triggered returns execution to hypervisor 30. In steps 402-404, hypervisor 30 then handles the single-step exception and switches single-step mode off. A step 406 may re-configure processor 12 to return to handling single-step exceptions in a default manner, or to the manner in which such exceptions were handled before executing step 398. A step 408 may then re-instate access permissions to the section of memory containing the target function, so that executing the trigger instruction amounts to a memory access violation. In some embodiments, execution of step 408 is similar to the execution of step 386 in FIG. 9-C.

The exemplary systems and methods described above allow a host system, such as a computer or a smartphone, to efficiently carry out computer security tasks when operating in a hardware virtualization configuration. Security tasks may include, among others, protecting the host system against malware such as computer viruses and spyware. In some embodiments, the host system is configured to execute an operating system and a set of software applications within a virtual machine. A security application may execute within the respective virtual machine, for instance in kernel mode, and may protect the respective virtual machine against malware and/or other computer security threats. In some embodiments, such protection comprises hooking a specific set of functions (for instance, functions belonging to the OS and configured to carry out memory management, file and/or registry access). Hooking may allow the security application to detect an attempt to execute such a function, and to determine whether the respective attempt is indicative of a computer security threat.

Hooking is a generic term used in the art of software engineering for a method of intercepting function calls, messages, or events passed between software components. One exemplary hooking method comprises altering the entry point of a target function, by inserting an instruction redirecting execution to a second function. Following such hooking, the second function may be executed instead, before, or after the target function. Another conventional hooking method comprises modifying the system service descriptor table (SSDT) maintained by the OS. Yet another conventional hooking method comprises configuring software components to be notified about certain events via minifilter notifications (a feature offered by some operating systems, such as Windows®). In yet another conventional hooking method, commonly known as model-specific register (MSR) hooking, a content of a special processor register used to manage system calls can be altered to redirect system calls to a filtering routine. One such exemplary MSR is the IA32_SYSENTER_EIP register on Intel® platforms.

Some embodiments of the present invention rely on the insight that conventional hooking methods are invasive and have multiple disadvantages. Inline hooking and SSDT patching may interfere with some protection mechanisms, such as PatchGuard® on 64-bit Windows® platforms. In a context of multithreading and/or running code on multiple CPU cores, patching may create other problems. For instance, successful hooking must assure that no thread is executing the code portion about to be patched, while such patching is in progress. Following hooking, the original execution flow of the hooked function must be maintained, thus the original code is typically relocated to another memory address. Such relocations typically create problems with instructions that contain relative memory references, which no longer point to the correct memory address.

Minifilter notifications also have a few disadvantages. Typically, only certain types of notifications may be communicated to a security application (e.g., indicative of process creation, termination, file operations, and registry operations). Moreover, the notification mechanism may be detected, disrupted, or bypassed by malware, so notifications might not reach their destination.

MSR hooking has the disadvantage of being limited to system calls (calls that switch execution from user-mode to kernel-mode), and not applicable to other objects/functions. Moreover, MSR hooking might impose a performance penalty on the host system, because it typically does not allow hooking a specific system call, but instead intercepts all system calls indiscriminately.

Some embodiments of the present invention introduce systems and methods enabling hooking without resorting to SSDT patching, minifilter notifications, or system-call MSRs. In contrast to such conventional methods, some embodiments of the present invention use advances in hardware virtualization technology to detect an attempt to execute a target section of code, such as a function or a processor instruction located at a particular memory address.

A hypervisor may execute on the respective host system (e.g., personal computer, smartphone, etc.), and may displace the operating system and/or applications to a virtual machine (VM). In some embodiments, the hypervisor configures the hardware of the host system to deliver a type of processor event, known as a virtualization exception, to a security application executing within the virtual machine. The virtualization exception may be triggered, for instance, when software executing within the respective VM attempts to access a memory page containing the target section of code (e.g., an entry point of a function selected for hooking) Upon receiving the virtualization exception, some embodiments of the security application may analyze the attempt to execute the target section of code, for instance to determine whether the attempt is indicative of a security threat.

Since the attempt to execute the target section of code is intercepted via a hardware event (virtualization exception), and since the respective event is delivered directly to a component of the security application, hooking performed according to some embodiments of the present invention may occur potentially without the OS and/or the monitored applications being aware of such hooking.

In some conventional computer security applications, an attempt to execute a target section of code may trigger a type of processor event known in the art as a VM exit, which suspends the execution of software within the protected VM and switch to executing the hypervisor. VM exit events may carry a substantial computational cost, potentially affecting the productivity and user experience. In contrast, some embodiments of the present invention achieve hooking without triggering a virtual machine exit event, and therefore with a relatively small computational cost.

It will be clear to a skilled artisan that the above embodiments may be altered in many ways without departing from the scope of the invention. Accordingly, the scope of the invention should be determined by the following claims and their legal equivalents.

What is claimed is:

1. A host system comprising at least one hardware processor configured to execute a hypervisor, the hypervisor further configured to:
   configure the at least one hardware processor to generate an exception in response to detecting a violation of a first memory access permission, the exception causing the at least one hardware processor to switch from executing a target function to executing a computer security program, wherein both the target function and the computer security program execute within a virtual machine exposed by the hypervisor, and wherein the computer security program is configured to determine whether the violation is indicative of a computer security threat; and
   configure the memory access permission so that a first attempt to execute the target function violates the first memory access permission, wherein the computer security program is further configured, in response to the at least one hardware processor switching from executing the target function to executing the computer security program, to cause the at least one hardware processor to switch from enforcing the first memory access permission to enforcing a second memory access permission, the second memory access permission configured so that a second attempt to execute the target function does not violate the second memory access permission.

2. The host system of claim 1, wherein the first memory access permission restricts access to a section of a memory of the host system, the section of the memory storing a part of the target function.

3. The host system of claim 2, wherein configuring the first memory access permission comprises marking the section as non-executable.

4. The host system of claim 2, wherein configuring the first memory access permission comprises marking the section as non-readable.

5. The host system of claim 2, wherein the part of the target function includes an entry point of the target function.

6. The host system of claim 1, wherein
the hypervisor is further configured to set up a first page table and a second page table, the first and second page tables usable by the at least one hardware processor to perform virtual-to-physical address translations for the virtual machine, wherein the first page table comprises the first memory access permission and wherein the second page table comprises the second memory access permission;
wherein the hypervisor is further configured to configure the at least one hardware processor to switch from using the first page table to using the second page table in response to receiving a specific processor instruction; and
wherein causing the at least one hardware processor to switch from enforcing the first memory access permission to enforcing the second memory access permission comprises the computer security program issuing the specific processor instruction.

7. The host system of claim 6, wherein the computer security program is further configured, in response to causing the at least one hardware processor to switch from enforcing the first memory access permission to enforcing the second memory access permission, to:
instruct the at least one hardware processor to execute a trigger instruction, the trigger instruction identified as a processor instruction undergoing execution when the at least one hardware processor generated the exception; and
in response to instructing the at least one hardware processor to execute the trigger instruction, instruct the at least one hardware processor to switch from using the second page table to using the first page table.

8. The host system of claim 1, wherein:
causing the at least one hardware processor to switch from enforcing the first memory access permission to enforcing the second memory access permission comprises transmitting a signal to the hypervisor; and
wherein the hypervisor is further configured, in response to receiving the signal, to change the first memory access permission to the second memory access permission.

9. The host system of claim 8, wherein the computer security program is further configured, in response to transmitting the signal to the hypervisor, to:
instruct the at least one hardware processor to execute a trigger instruction, the trigger instruction identified as a processor instruction undergoing execution when the at least one hardware processor generated the exception; and
in response, transmit a second signal to the hypervisor, and
wherein the hypervisor is further configured, in response to receiving the second signal, to change the second memory access permission to the first memory access permission.

10. A method of protecting a host system from computer security threats, the method comprising employing at least one hardware processor of the host system to execute a hypervisor, wherein executing the hypervisor includes:
exposing a virtual machine on the host system;
configuring the at least one hardware processor to generate an exception in response to detecting a violation of a first memory access permission, the exception causing the at least one hardware processor to switch from executing a target function to executing a computer security program, wherein both the target function and the computer security program execute within the virtual machine, and wherein the computer security program is configured to determine whether the violation is indicative of a computer security threat; and
configuring the memory access permission so that a first attempt to execute the target function violates the first memory access permission,
wherein the computer security program is further configured, in response to the at least one hardware processor switching from executing the target function to executing the computer security program, to cause the at least one hardware processor to switch from enforcing the first memory access permission to enforcing a second memory access permission, the second memory access permission configured so that a second attempt to execute the target function does no violate the second memory access permission.

11. The method of claim 10, wherein the first memory access permission restricts access to a section of a memory of the host system, the section of the memory storing a part of the target function.

12. The method of claim 11, wherein configuring the first memory access permission comprises marking the section as non-executable.

13. The method of claim 11, wherein configuring the first memory access permission comprises marking the section as non-readable.

14. The method of claim 11, wherein the part of the target function includes an entry point of the target function.

15. The method of claim 10, wherein executing the hypervisor further comprises:
setting up a first page table and a second page table, the first and second page tables usable by the at least one hardware processor to perform virtual-to-physical address translations for the virtual machine, wherein the first page table comprises the first memory access permission and wherein the second page table comprises the second memory access permission;
configuring the at least one hardware processor to switch from using the first page table to using the second page table in response to receiving a specific processor instruction; and
wherein causing the at least one hardware processor to switch from enforcing the first memory access permission to enforcing the second memory access permission comprises the computer security program issuing the specific processor instruction.

16. The method of claim 15, wherein the computer security program is further configured, in response to causing the at least one hardware processor to switch from enforcing the first memory access permission to enforcing the second memory access permission:

instruct the at least one hardware processor to execute a trigger instruction within the virtual machine, the trigger instruction identified as a processor instruction undergoing execution when the at least one hardware processor generated the exception; and in response to instructing the at least one hardware processor to execute the trigger instruction, instruct the at least one hardware processor to switch from using the second page table to using the first page table.

17. The method of claim 10, wherein:

causing the at least one hardware processor to switch from enforcing the first memory access permission to enforcing the second memory access permission comprises transmitting a signal to the hypervisor; and wherein executing the hypervisor further comprises, in response to receiving the signal, changing the first memory access permission to the second memory access permission.

18. The method of claim 17, wherein the computer security program is further configured, in response to transmitting the signal to the hypervisor, to:

instruct the at least one hardware processor to execute a trigger instruction, the trigger instruction identified as a processor instruction undergoing execution when the at least one hardware processor generated the exception, and in response, transmit a second signal to the hypervisor, and wherein executing the hypervisor further comprises, in response to receiving the second signal, changing the second memory access permission to the first memory access permission.

19. A on-transitory computer-readable medium storing instructions which, when executed by at least one hardware processor of a host system, cause the host system to form a hypervisor and a computer security program, the computer security program executing within a virtual machine exposed by the hypervisor, wherein:

the hypervisor is configured to:

configure the at least one hardware processor to generate an exception in response to detecting a violation of a first memory access permission, wherein generating the exception causes the at least one hardware processor to switch from executing a target function to executing the computer security program, wherein the target function executes within the virtual machine, and configure the first memory access permission so that a first attempt to execute the target function violates the first memory access permission; and the computer security program is configured to:

determine whether the violation is indicative of a computer security threat, and in response to the at least one hardware processor switching from executing the target function to executing the computer security program, cause the at least one hardware processor to switch from enforcing the first memory access permission to enforcing a second memory access permission, the second memory access permission configured so that a second attempt to execute the target function does not violate the second memory access permission.

* * * * *